United States Patent
Wöntner

[19]

[11] Patent Number: 6,029,542

[45] Date of Patent: Feb. 29, 2000

[54] POWER-SPLIT GEAR AND ITS INSTALLATION IN A GEAR CASE

[75] Inventor: Gebhard Wöntner, Wolfern, Austria

[73] Assignee: Steyr-Daimler-Puch Aktiengesellschaft, Vienna, Austria

[21] Appl. No.: 09/145,998

[22] Filed: Sep. 2, 1998

[30] Foreign Application Priority Data

Sep. 9, 1997 [AT] Austria ..................... 1509/97
Dec. 29, 1997 [EP] European Pat. Off. ............. 97890258

[51] Int. Cl.[7] .................................. F16H 57/02
[52] U.S. Cl. ........................... 74/606 R; 475/72
[58] Field of Search ............... 74/606 R; 475/72

[56] References Cited

U.S. PATENT DOCUMENTS 4,706,806 11/1987 Mauthe .
5,159,855 11/1992 Nikolaus et al. .
5,203,747 4/1993 Warren ....................... 475/72
5,345,839 9/1994 Nett et al. .

Primary Examiner—Mary Ann Battista
Attorney, Agent, or Firm—Bachman & LaPointe, P.C.

[57] ABSTRACT

A power-split gear consists of a hydrostatic unit and of a mechanical gear unit which are accommodated in a common case with a cover. So that the components can be easily mounted and exchanged, a distributor shaft coupled to an engine is mounted in the case, a gearwheel for driving the hydrostatic unit and the mechanical gear unit being in each case arranged fixedly in terms of rotation on the distributor shaft, the hydrostatic unit is fastened to the inside of the cover, the cover has, on the inside, a fitting face which cooperates with at least one counterface of a bearing pedestal of the mechanical gear unit, fluid ducts provided in the cover opening out in the fitting face, and control elements connected to the fluid ducts are arranged on the outer face of the cover.

10 Claims, 8 Drawing Sheets

POWER-SPLIT GEAR AND ITS INSTALLATION IN A GEAR CASE

BACKGROUND OF THE INVENTION

The invention relates to a power-split gear, consisting of a hydrostatic unit and of a mechanical gear unit containing a summing gear and range gear, said hydrostatic unit and gear unit being accommodated in a common case with a cover, the mechanical gear unit being arranged on the case cover, and being capable of being inserted as a closed subassembly into the case. The mechanical gear unit constitutes the mechanical branch, the hydrostatic unit the hydrostatic branch.

Power-split gears having the components mentioned are high-efficiency continuously variable gears which, above all in tractors, are intended to replace the conventional multi-step gears having 30 shift steps or more. They differ fundamentally from the latter; the summing gear is a complex planetary gear and the range gears are shifted by means of hydraulically actuated clutches or brakes. They are therefore highly complicated both mechanically and in terms of their control. Gears of this type are described, for example, in DE-A1 40 27 724, 44 01 509 and 195 25 823, as well as in U.S. Pat. No. 4,706,806.

Installing their components in the case or exchanging them and conducting an operating test on them is therefore difficult and labor-intensive, above all as regards a tractor gear, the case of which is screwed to the engine block and rear axle forming the basic structure of a tractor. In addition, numerous fluid connections, which are usually made by means of hoses and pipes, are required for lubrication and control and for the hydrostatic unit, and the latter, because it generates noise, needs a suspension which decouples structure-borne sound. All this makes assembly even more difficult and the connecting parts make the gear susceptible to faults.

Admittedly, it is known from EP 115 794 A1, in power-shiftable toothed change gears of conventional type, to insert a layshaft, together with its couplings, as a closed subassembly into the case from outside through an orifice closable by means of a cover, for which purpose the cover may be provided with carrying arms. However, the layshaft is only an individual shaft which can easily be mounted at its two ends and otherwise cooperates only with the mutually coaxial main gear shafts, namely the input and the output shaft.

Furthermore, it is known from U.S. Pat. No. 5,345,839 to suspend a hydrostatic (and therefore also fundamentally different) gear in a case by means of transverse rods so as to be decoupled from structure-borne sound. The gear can consequently be inserted as a subassembly into the case from outside, but it is difficult to make the connections necessary for control and the transverse rods make it virtually impossible to accommodate further gear elements in the case.

The object of the invention, therefore, is to design the case of a power-split gear in such a way that the components of the gear can be mounted and demounted easily at the least possible outlay in terms of construction and its components are simple to exchange, and in such a way that there are as few parts susceptible to faults as possible and test runs can be carried out prior to installation.

SUMMARY OF THE INVENTION

The foregoing object is achieved, according to the invention, in that:

(a) a distributor shaft coupled to an engine is mounted in the case, a gearwheel for driving the hydrostatic unit and the mechanical gear unit being in each case arranged fixedly in terms of rotation on said distributor shaft, (b) the hydrostatic unit is fastened to the inside of the cover and has a hydrostatic input gearwheel and a hydrostatic output gearwheel, the former meshing with the corresponding gearwheel on the distributor shaft fixed to the case and the latter meshing with an input gearwheel of the mechanical gear unit, (c) the cover has a fitting face which cooperates with at least one counterface of the mechanical gear unit, fluid ducts provided in the cover opening out in the fitting face, (d) control elements connected to the fluid ducts are arranged on the outside of the cover.

According to feature (a), the distributor shaft coupled to the engine can remain in the case when the gear is being removed. Only in this way is it possible to be able to install the individual elements of the power-split gear individually, without the case being stripped down. The distributor shaft is a very simple shaft which is accurately mounted on both sides in the case and which carries only the two gearwheels intended for introducing force into the hydrostatic unit and into the gear unit, but does not carry any other gear elements. One of the gearwheels meshes with the hydrostatic unit and the other with the gear unit, said units both being inserted jointly with the cover.

According to feature (b), not only the gear unit, but the latter together with the hydrostatic unit, can be inserted into the case and, in conjunction with the control elements according to feature (d) mounted on the outside of the cover, can undergo an operating test prior to insertion.

Feature (c), on the one hand, makes it possible to fasten two different elements, namely the hydrostatic unit and the mechanical gear unit or gear units, in the cover in such a way that their intermeshing gearwheels and their gearwheels meshing with the gearwheels on the distributor shaft are accurately positioned. On the other hand, the ducts routed in the cover make it unnecessary to have pipe connections which are susceptible to faults, the fitting faces also serving at the same time as sealing faces.

In a feature of the inventive idea, the hydrostatic unit is mounted on further fitting faces of the cover by means of radial supports so as to insulate against structure-borne sound and, for supporting the torque, has a radially projecting pipe socket which is guided in a bore of the cover sealingly and so as to insulate against structure-borne sound and which makes a fluid connection between the hydrostatic unit and a fluid duct in the cover. The pipe socket thus performs three functions: firstly, it serves to divert the torque reaction into the cover, without impeding radial heat expansions of the hydrostatic unit; secondly, it serves to deliver working fluid directly from the cover, hence without any pipeline at all, even if the pump is mounted on the cover; thirdly, it acts as an insulating element. For this purpose, the pipe socket is guided in the case cover preferably by means of an elastic bush which consists of two metal sockets and an elastomeric intermediate layer.

In a preferred embodiment as a tractor gear, the distributor shaft passes through the gear case over the entire length of the latter and makes the connection with a power takeoff shaft. In other words, the drive shaft present in any case for the power takeoff shaft is, at the same time, the distributor shaft. An entire shaft is therefore dispensed with. Under some circumstances, even the double clutch on the engine, said double clutch being conventional in tractors, may be replaced by a simple separating clutch.

In a further feature of the invention, a duct is provided in each case in the cover and at the bottom of the case, said ducts sealingly adjoining one another in the lower part of the cover flange, the duct forming an intake mouth in the case. Furthermore, an oil filter may be mounted on the outside of the cover, said oil filter being connected to the intake mouth or the oil pump via ducts in the cover. The entire fluid supply (lubricating oil, working oil for the hydrostatic unit and for the clutches in the gear unit) thereby takes place completely without exposed pipelines.

In an advantageous refinement, the control elements arranged on an outer face of the cover can also form a valve block. If, furthermore, the cover then has a bore for a revolution sensor, said bore leading from the inside outward, all the members necessary for operation are combined on the cover and have the shortest possible communication paths.

For the gear to be used in farm tractors or commercial vehicles, it is particularly advantageous to arrange the cover on a side face of the case. In addition to the advantage of the gear being exchangeable, without the drive train (engine block/gear case/rear axle) being stripped down, in the case of tractors, this also ensures that not even the driver's cab (of a commercial vehicle or a tractor) has to be swung up or removed.

Other advantages, features and details of the invention will be made clear from the following detailed description.

BRIEF DESCRIPTION OF THE DRAWINGS

The invention is described below with reference to figures, of which.

DETAILED DESCRIPTION

Figure 1:
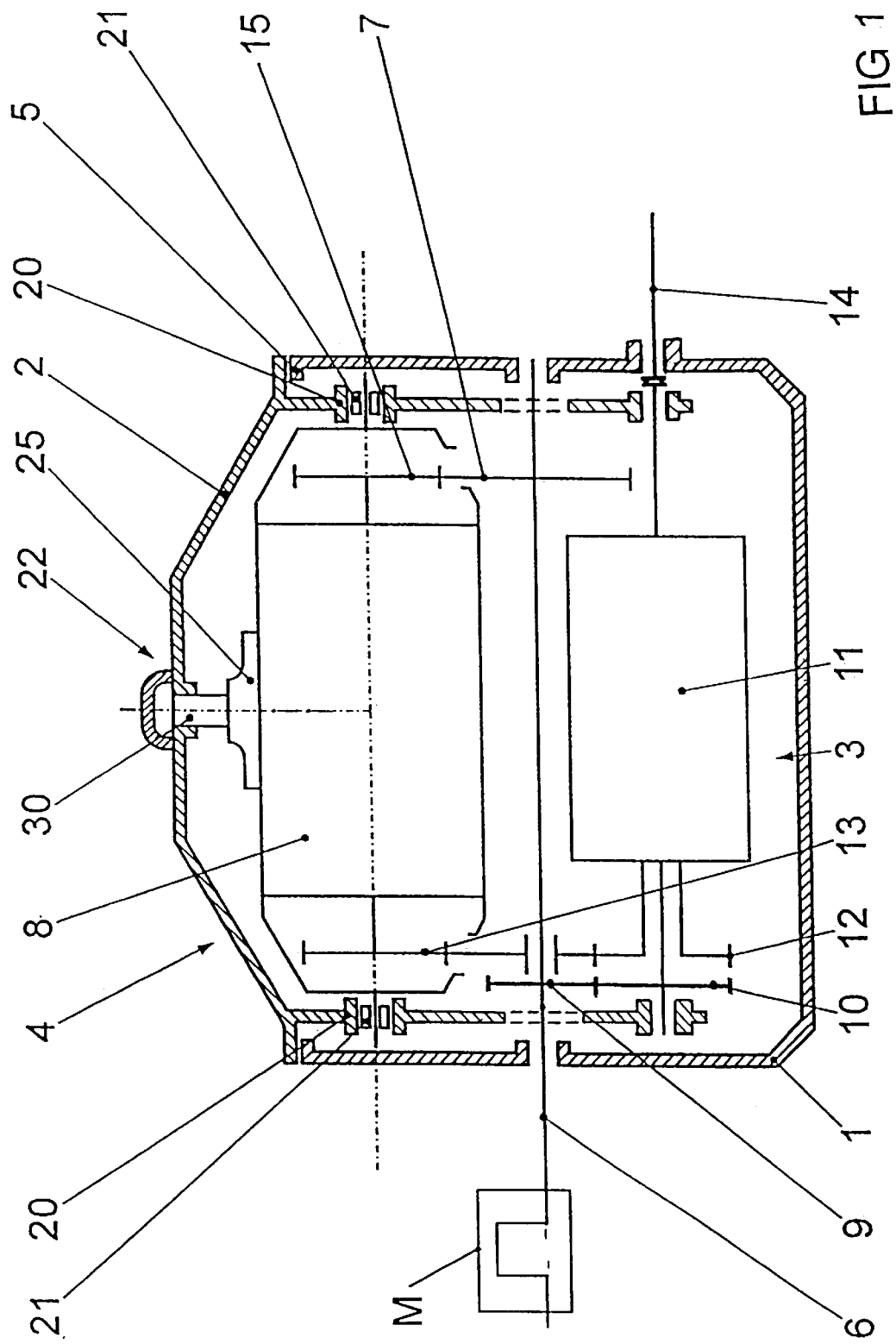
FIG. 1: shows a diagram of the gear according to the invention.

In FIG. 1, the case of a hydrostatic/mechanical power-split gear is designated by 1 and its cover by 2, the shape 20 of the case and of the cover being adaptable, as desired, to the respective design and arrangement of the gear elements. Located in the case 1 are the gear components which form a mechanical branch 3 and a hydrostatic branch 4. The case cover 2 is screwed onto a cover flange 5 of the gear case 1, said cover flange being of any desired shape. A drive shaft 6 is driven by an engine M, merely indicated, and consequently drives a hydrostatic unit 8 via first gearwheels 7, 15 and the mechanical gear unit 11 via second gearwheels 9, 10.

The hydrostatic unit 8 consists, for example, of two hydrostatic pump/motor units, one of which is adjustable and one of which, in each case, works either as a pump or as a motor, depending on the torque flow direction and the operating state. The transmission of the hydrostatic unit 8 is thereby continuously variable. The hydrostatic unit 8, in turn, is connected to the mechanical gear unit 11 via a gearwheel train 12, 13. In said gear unit, the movements introduced via the two input shafts 10, 12 are superposed and are changed over, within ranges, by means of following gear steps and clutches, so that, via a driven shaft 14, a rotational speed varied within a very wide range is available for driving, for example, a vehicle.

A bearing pedestal 20 is located in the case cover 2 on each of the two sides of the hydrostatic unit 8 for the purpose of supporting the latter radially. It is essential that this radial support be provided in relation to the case cover 2 and not in relation to the case 1. The arrangement and design of elastic elements 21 which support the case of the hydrostatic unit 8 so as to damp vibrations may vary greatly. Sundry embodiments are described in DE 43 00 156. Provided approximately in the middle between the two bearing pedestals 20 is a torque support 22, via which the torque reaction occurring during the torque transmission of the hydrostatic unit is conducted into the case cover 2.

Figure 2:
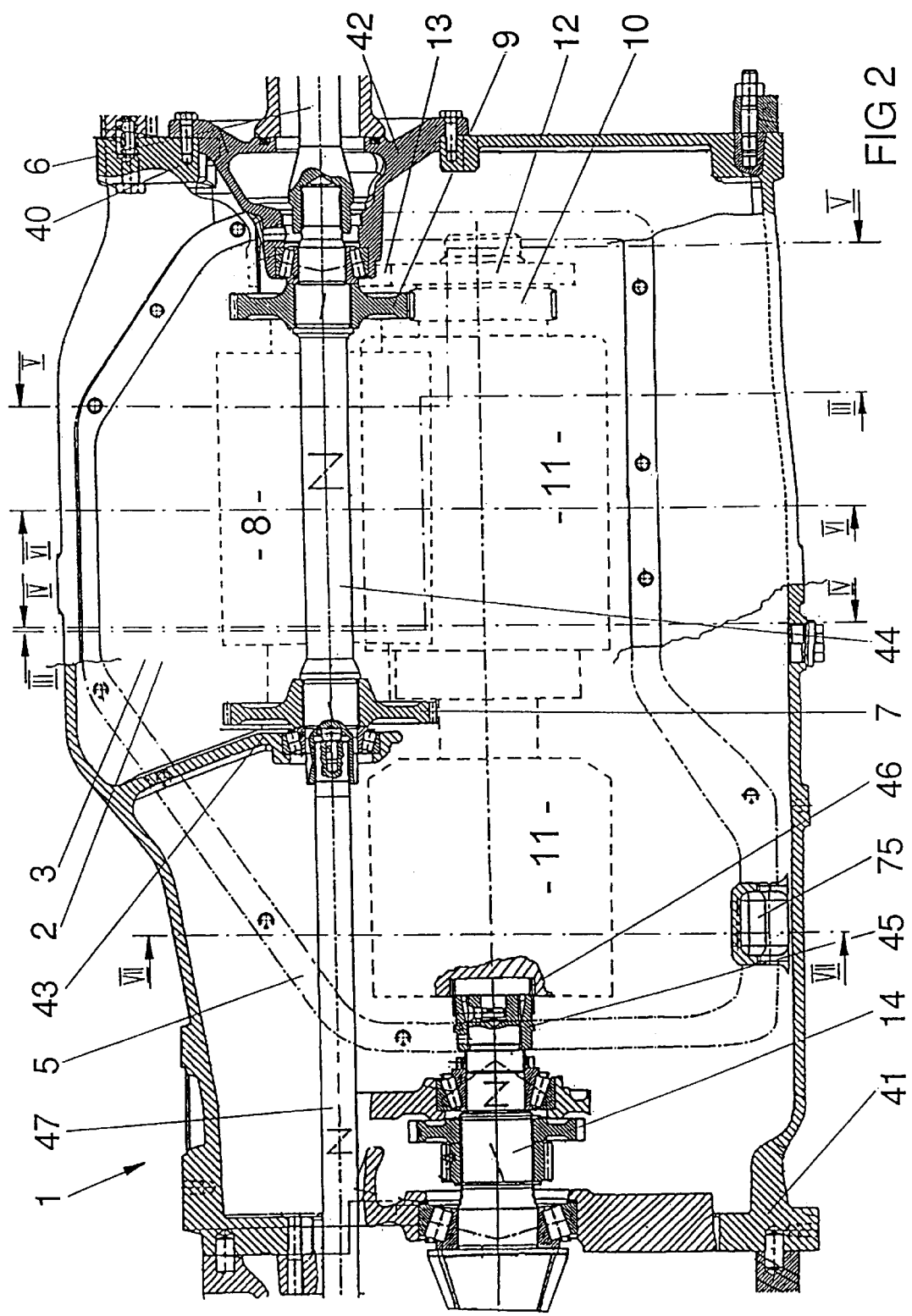
FIG. 2: shows a vertical longitudinal section through the case of an exemplary embodiment of the gear according to the invention, with the cover removed.

FIG. 2 shows the case 1 with the cover removed, which is why the hydrostatic unit 8 and the mechanical gear unit 11 are indicated merely by broken lines. Their axes do not lie in one plane here, but, as may be seen from the sections, at the corner points of a triangle. The design of the hydrostatic unit and gear unit may vary greatly within the scope of the invention. The case 1 is designed as a tunnel, with a connecting flange 40 located on the engine side and with a connecting flange 41 located on the rear-axle side. A bearing collar 42 is provided in the connecting flange 40 and, further to the rear, a bearing partition 43 is provided in the gear, a distributor shaft 44 being mounted fixedly relative to the housing in corresponding rolling bearings in said bearing collar and bearing partition. A gearwheel 9 for driving the mechanical gear unit 11 and a gearwheel 7 for driving the hydrostatic unit 8 are arranged fixedly in terms of rotation on the distributor shaft 44. Since these gearwheels are arranged in each case in the vicinity of a bearing, they are guided with great accuracy. Takeoff occurs from the mechanical gear unit 11, via a longitudinally displaceable mounting sleeve 45, to the output shaft 14 which is fixed to the case. The mounting sleeve 45 is shown in the released position. After the mechanical unit has been installed in the case, said unit is pushed into a corresponding internal spline 46 in the output shaft of the mechanical gear unit 11. A power takeoff shaft 47 rearwardly adjoins the distributor shaft 44 fixedly in terms of rotation. Said power takeoff shaft is thus led past the entire gear and rotates at the engine speed. The distributor shaft thus serves, at the same time, for driving the power takeoff shaft.

Figure 3:
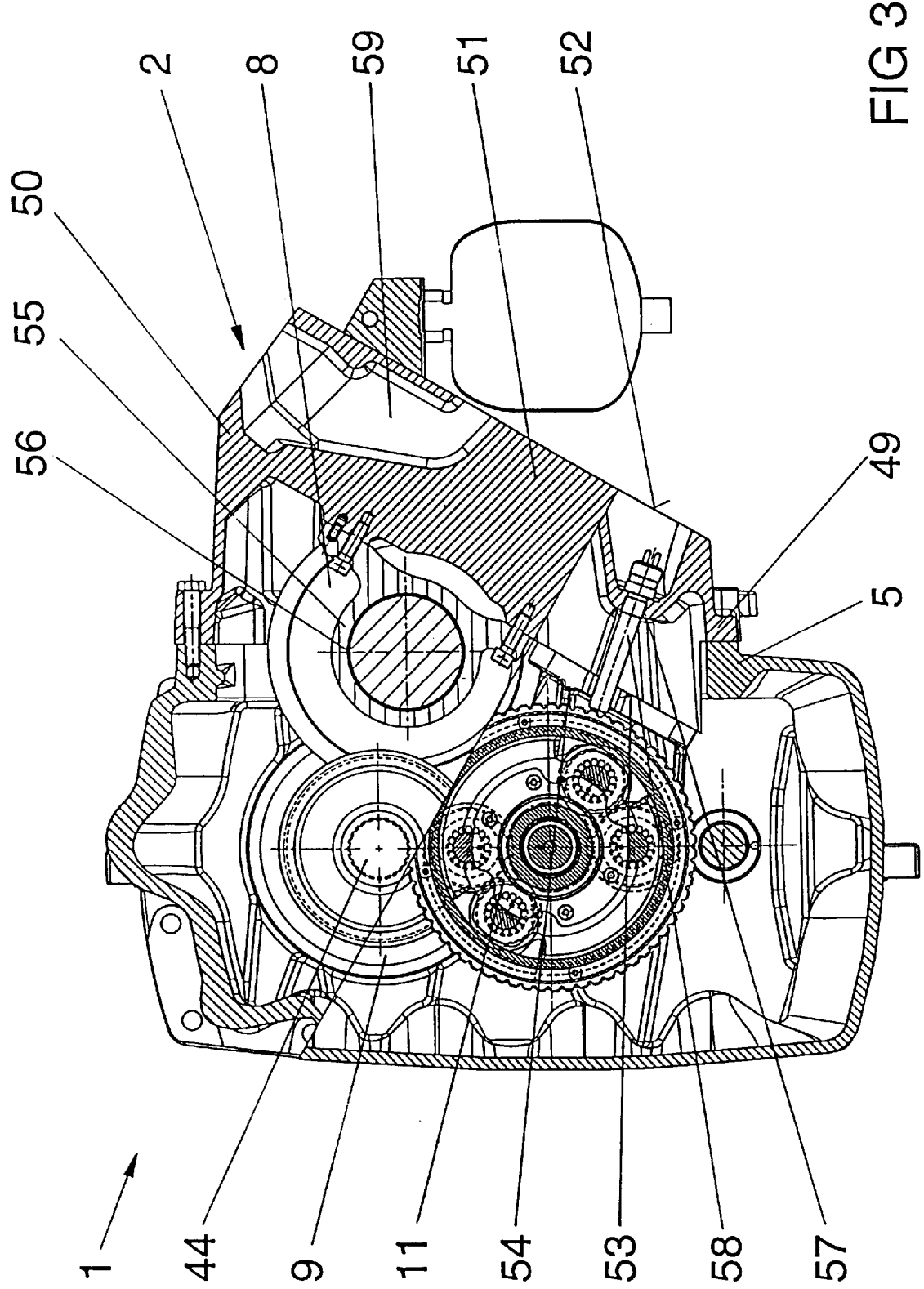
FIG. 3: shows a cross section according to III—III in FIG. 2, FIG. 4: shows a cross section according to IV—IV in FIG. 2, FIG. 5: shows a cross section according to V—V in FIG. 2, FIG. 6: shows a cross section according to VI—VI in FIG. 2, FIG. 7: shows a cross section according to VII—VII in FIG. 2, and FIG. 8: shows an alternative detail to FIG. 6.

It can be seen, again in FIG. 3 that the gear case 1 is a closed box having, laterally, a vertical cover flange 5. Inside the case 1, the distributor shaft 44 can be seen at the top, and, under it, the mechanical gear unit 11 which is driven by the gearwheel 9 of the distributor shaft 44. A shaft for an additional front wheel drive is also indicated below the mechanical gear unit 11. A cover 2 is screwed to the cover flange 5 of the case by means of a flange 49. The cover 2, in a cross section perpendicular to the flange plane, is approximately triangular, so as to afford space in its upper part for the hydrostatic unit 8. In cross section, the cover 2 consists of an upper wall 50 and of an oblique thick baseplate 51 which is inclined downward and inward. This baseplate 51 has a machined outer face 52 and, on the inside, at least one fitting face 53. Bearing pedestals 54 for the mechanical gear unit 11 are accurately fastened, for example with the aid of locating pins, to this fitting face 53 by means of correspondingly accurately machined counter-faces. Oil for lubricating and actuating the clutches of the mechanical gear unit 11 is supplied through these bearing pedestals. Radial supports 55 for the hydrostatic unit 8 are likewise mounted on the fitting face 53. For insulating against structure-borne sound, elastic insulating rings 56 are arranged between the radial support 55 and the body of the hydrostatic unit. In this way, both the mechanical gear unit 11 and the hydrostatic unit 8 are fastened with an exact fit in the cover 2 and both can be mounted jointly with the cover. Furthermore, at least one bore 57 for a revolution sensor 58, which delivers to the control device signals indicating the rotational speed of individual members, is located in the cover 2. A fluid duct 59 can also be seen in the upper part of the baseplate 51 of the cover 2.

Figure 4:
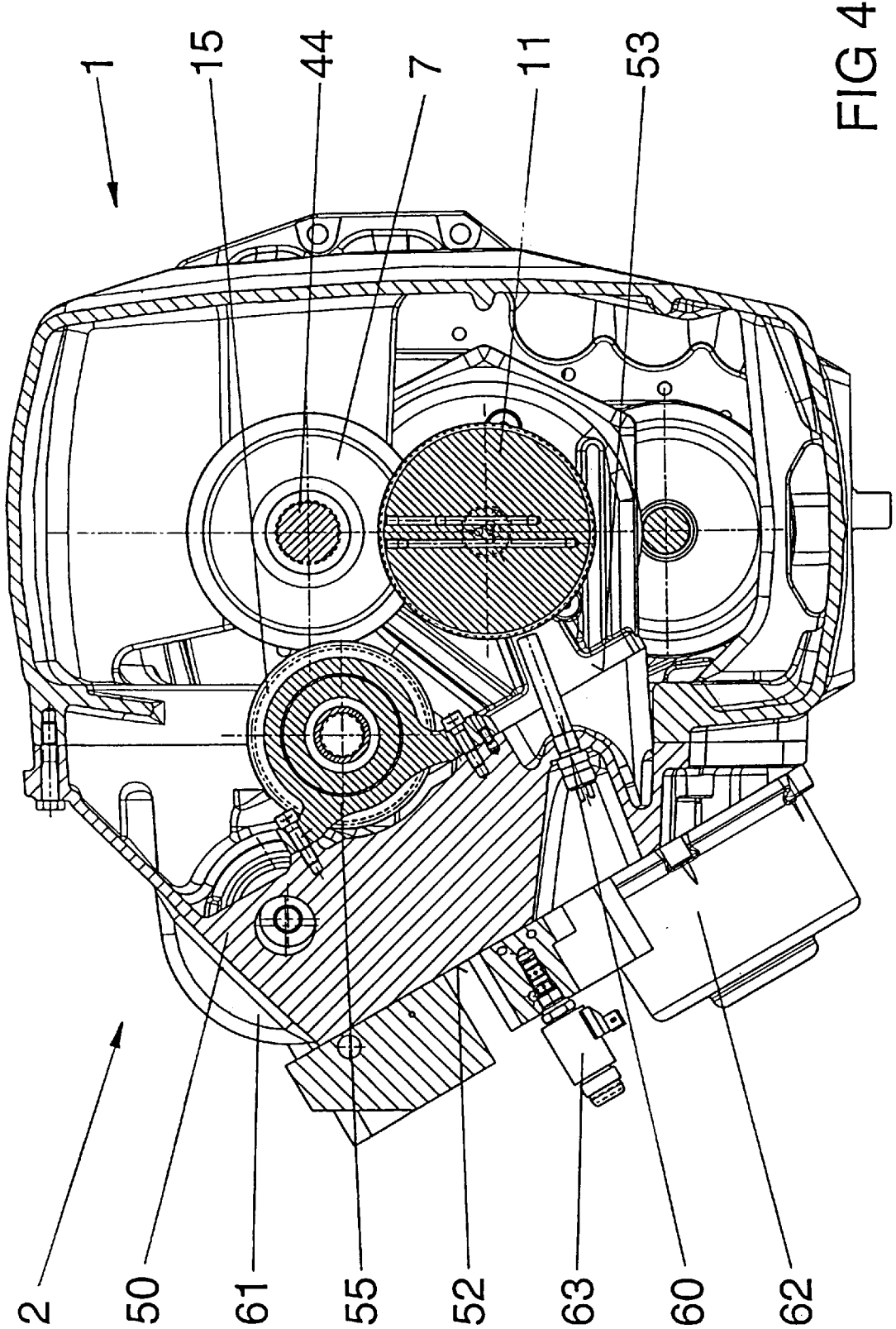

A further revolution sensor 60 can be seen in FIG. 4. An oil pump 61 is provided in the upper part of the baseplate 51. Said oil pump is driven, for example, from the gearwheel 15. An oil filter 62 is sealingly screwed directly to the outer face 52 in the lower part of the baseplate 51. A control element 63, for example a valve block, is likewise screwed onto the cleanly machined outer face.

Figure 5:
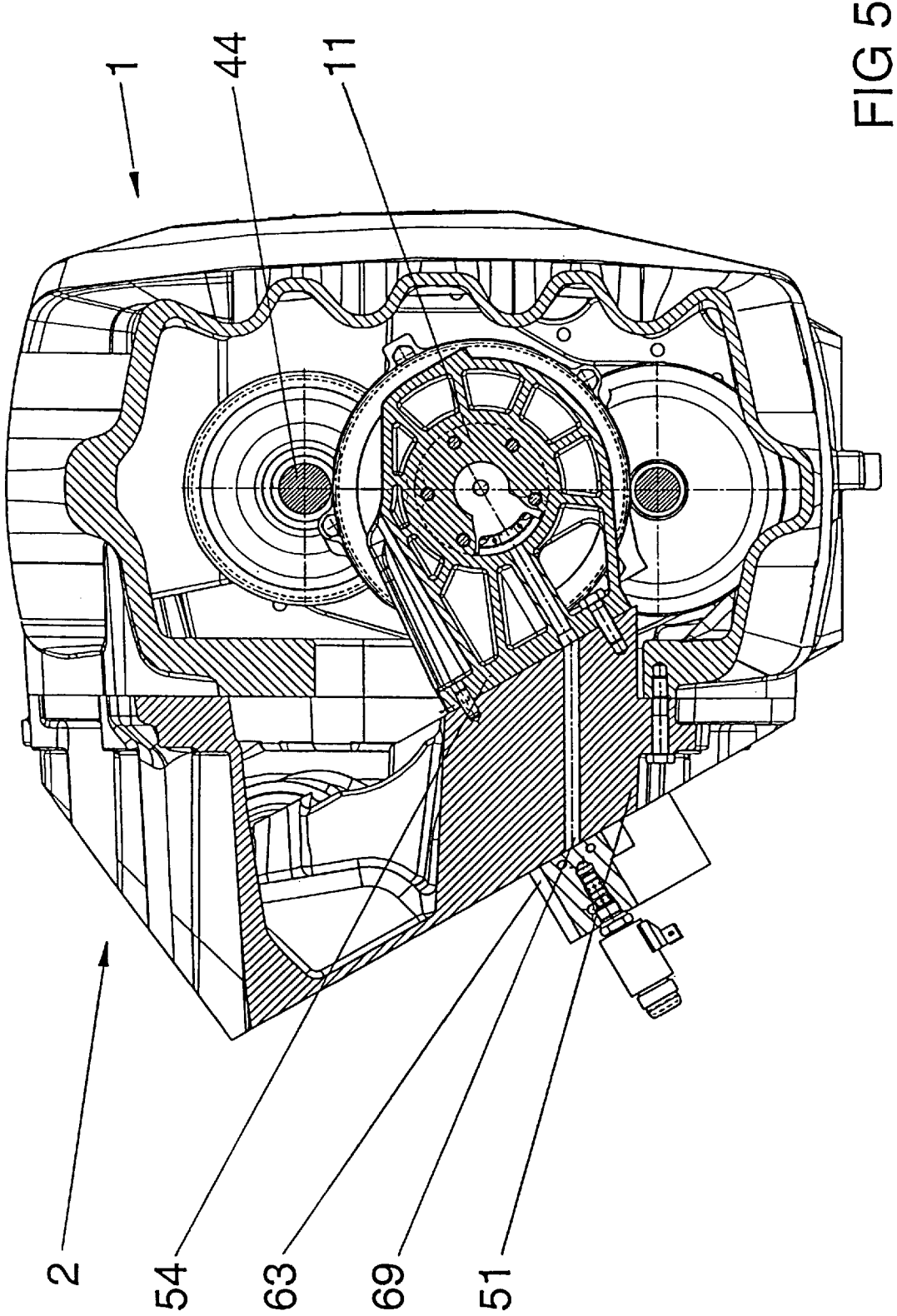

In FIG. 5, the hydrostatic unit is omitted. A fluid duct 69 for lubricating the mechanical gear unit 11 can be seen. Said duct leads through the baseplate 51 of the cover 2 directly into the bearing pedestal 54.

Figure 6:
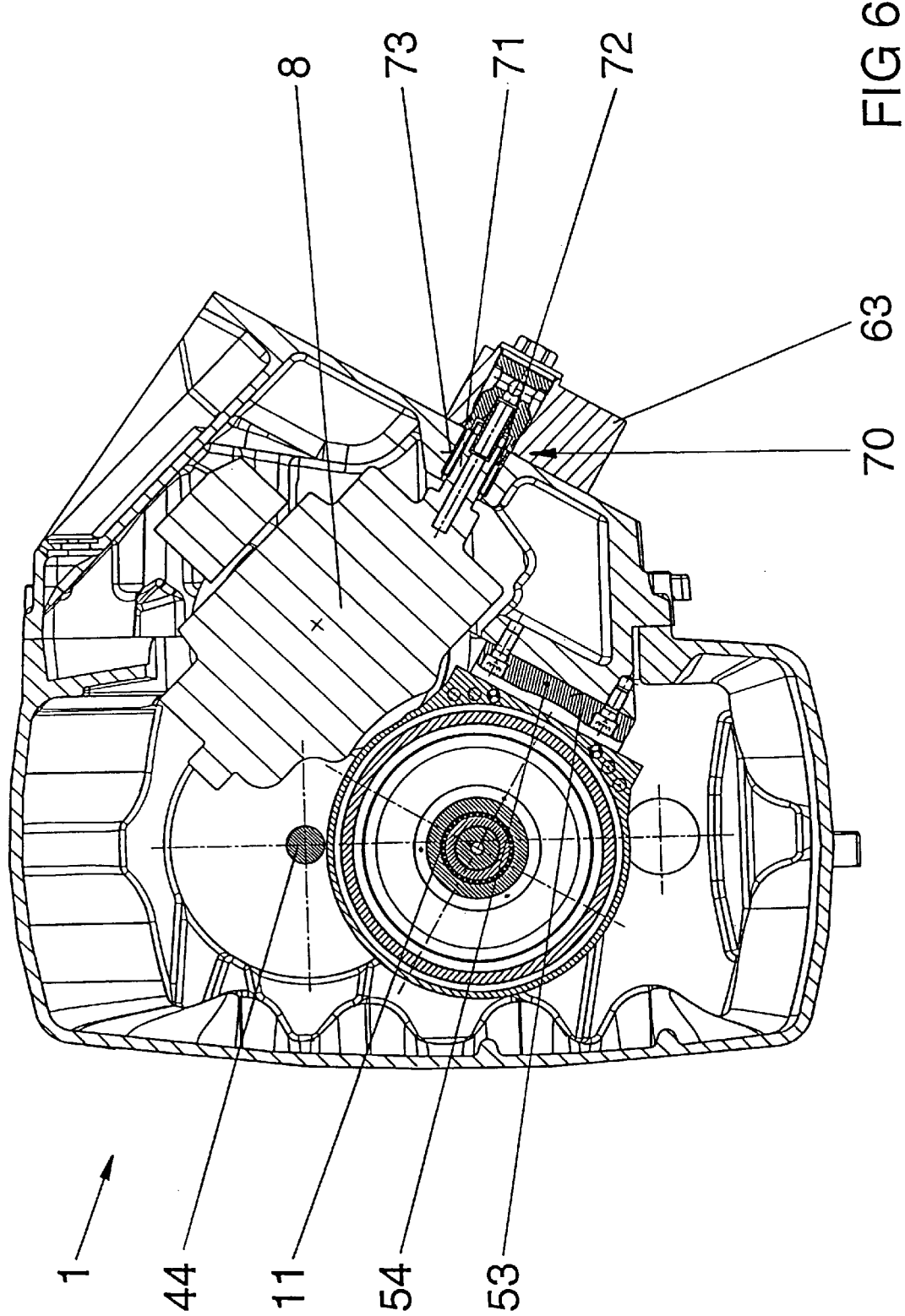

In FIG. 6, the contours of the hydrostatic unit 8 are marked. Its radial support was described with reference to FIGS. 3 and 4. A torque support 70 is additionally provided, consisting of a radial pipe socket 71 which is inserted in a bore 73 of the baseplate, with an elastic bush 72 being interposed. The pipe socket 71 not only serves for torque support, but also makes a line connection to the control unit 63, said connection not being impaired by heat expansions.

Figure 7:
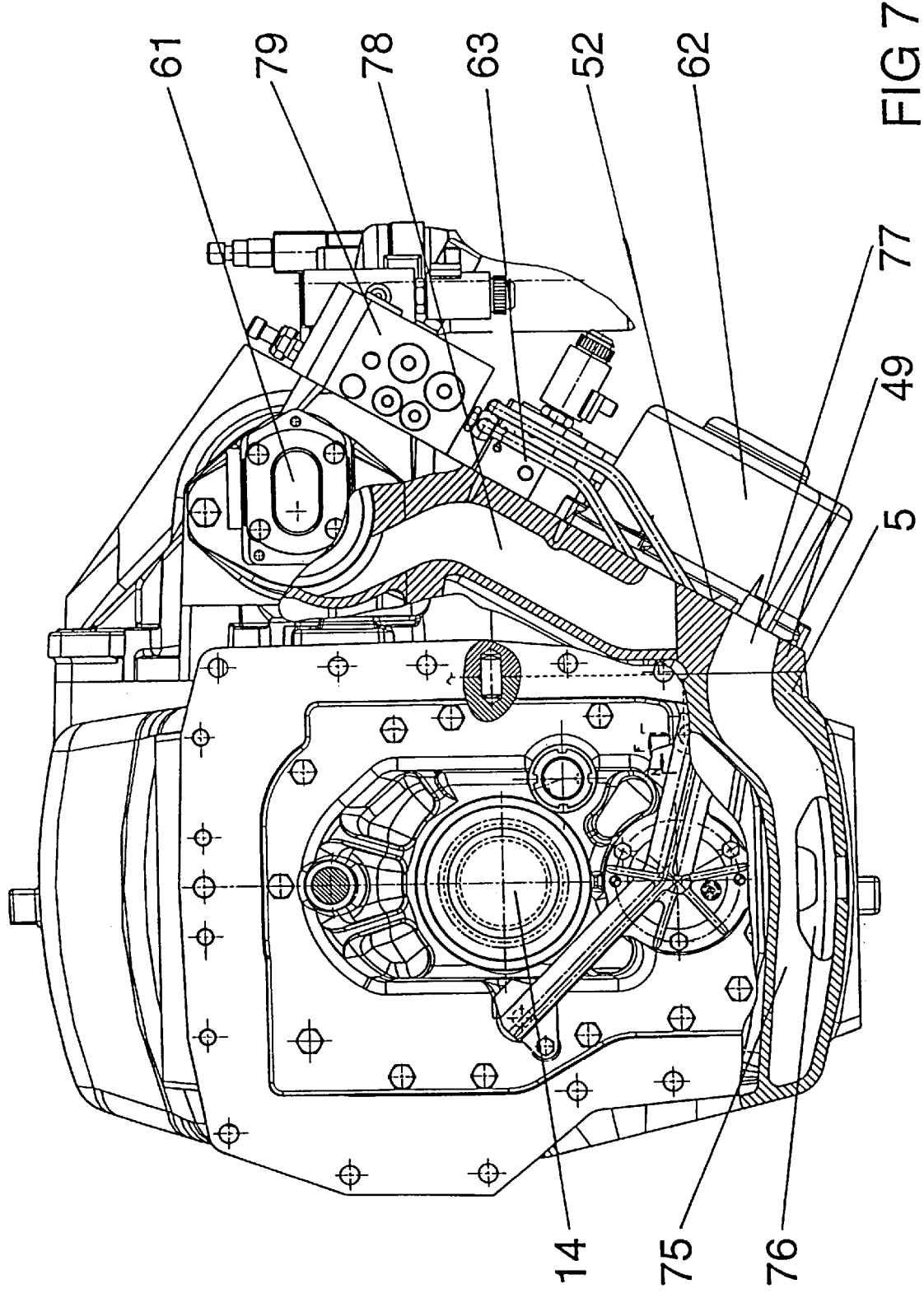

FIG. 7 shows the gear according to the invention partly in elevation. It is cut away where a duct 75 (see also FIG. 2) with an intake mouth 76 is provided in the bottom. Said duct leads to the cover flange 5 and is continued in a cover duct 77 in the cover 2, said cover duct leading to an oil filter 62 on the outer face 52. From this oil filter, the oil flows further through a duct 78 into the oil pump 61, likewise adjoining the cover, and from there to a further control element 79. The entire oil supply from the sump in the case bottom via the filter 62 and the pump 61 and adjoining control elements 63, 79 is thus fixed to the case and without any pipelines or pressure hoses. In particular, all the essential parts are arranged on the cover 2 and are connected by means of ducts, for example 77, 78, 69 (FIG. 5) and 59 (FIG. 3), which are cast into the cover.

Figure 8:
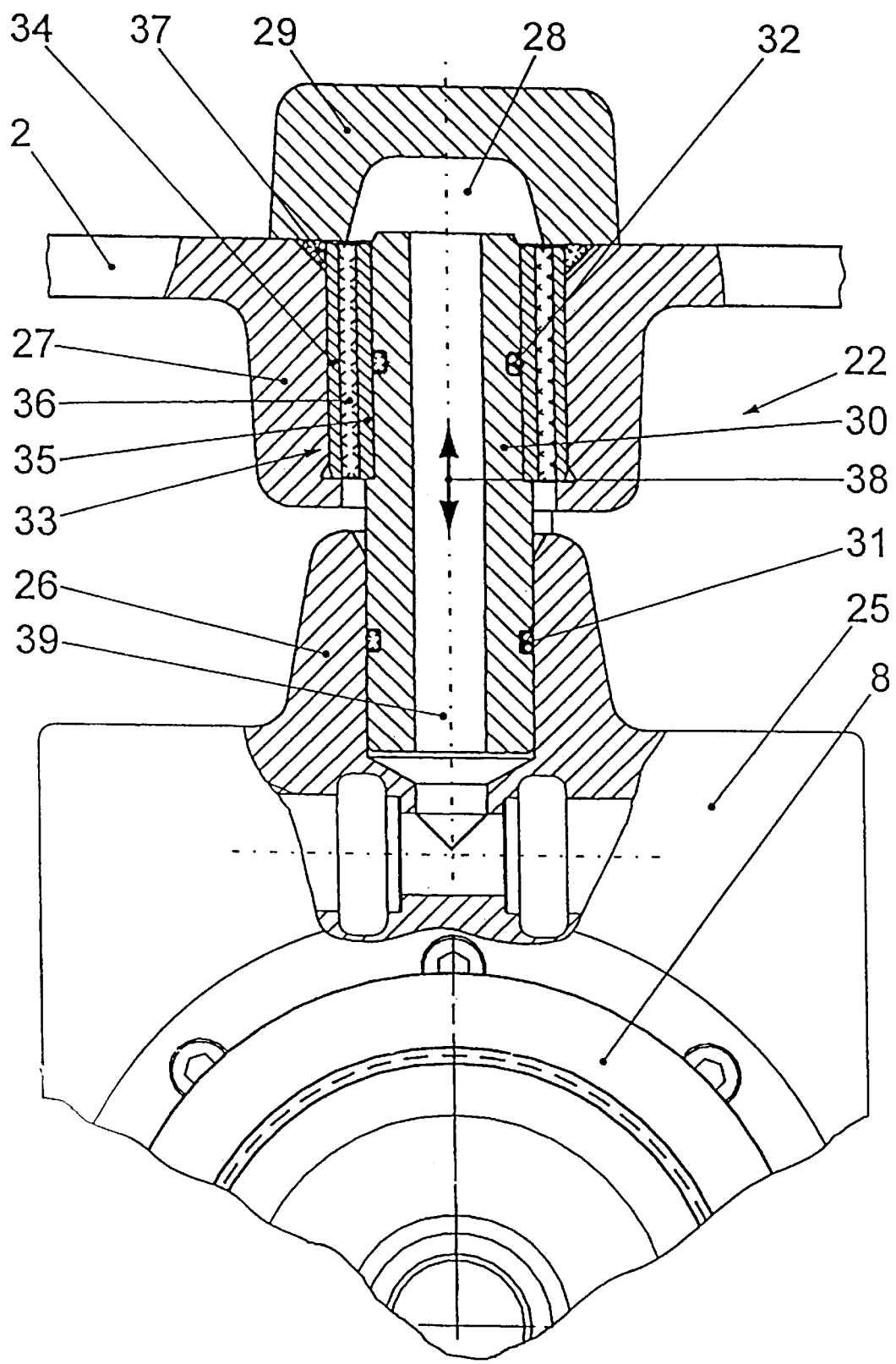

An alternative form of the torque support 70 is illustrated in detail in FIG. 8. The hydrostatic unit 8 has a valve block with a collar 26, and the case cover 2 has an inwardly directed collar 27. In the variant illustrated, a further feed duct 28, which could also be inside the cover 2, is formed. This feed duct 28 serves for supplying the operating fluid for the hydrostatic unit from a gear sump by means of the oil pump 61, once again through the cover.

The two collars 26, 27 receive a pipe socket 30, O-rings 31, 32 being provided in each case. Provided between the collar 27 and the pipe socket 30 is an elastic bush 33 consisting of an outer metal socket 34 and an inner metal socket 35 which are connected to one another by means of an elastic intermediate layer 36, for example by vulcanizing in the elastomer material of intermediate layer 36 between the two metal sockets 34, 35.

When the feed part 29 is fastened removably to the cover 2, as shown, a sealing ring 37 is also provided. The pipe socket 30 can thus be displaced in the radial direction 38 in relation to the two collars 26, 27 and therefore allows the radial expansion of the hydrostatic unit 8 in relation to the gear case 1 or the cover 2. The elastic bush 33 ensures insulation against structure-borne sound and the absorption of vibrations or load shocks and that the torque reaction is introduced into the case. The duct 39 formed by the pipe socket 30 makes the connection between the feed duct 28 and a valve block 25.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A power-split gear, comprising a hydrostatic unit and a mechanical gear unit containing a summing gear and range gear, said hydrostatic unit and said mechanical gear unit being accommodated in a common case with a cover, the mechanical gear unit being arranged on the case cover and being capable of being inserted as a closed subassembly into the case, wherein (a) a distributor shaft coupled to an engine is mounted in the case, a gearwheel for driving the hydrostatic unit and the mechanical gear unit being in each case arranged fixedly in terms of rotation on said distributor shaft;

(b) the hydrostatic unit is fastened to the inside of the cover and has a hydrostatic input gearwheel and a hydrostatic output gearwheel, the former meshing with the corresponding gearwheel on the distributor shaft fixed to the case and the latter meshing with an input gearwheel of the mechanical gear unit;

(c) the cover has, on an inside surface, a fitting face which cooperates with at least one counterface of a bearing pedestal of the mechanical gear unit, fluid ducts provided in the cover opening out in the fitting face; and (d) control elements connected to the fluid ducts are arranged on an outer face of the cover.

2. The power-split gear as claimed in claim 1, wherein the hydrostatic unit is mounted on a fitting face of the cover by means of radial supports so as to insulate against structure-borne sound and has, as a torque support, a radially projecting pipe socket which is guided in a bore of the cover sealingly and so as to insulate against structure-borne sound and which makes a fluid connection between the hydrostatic unit and a control element in or on the cover.

3. The power-split gear as claimed in claim 2, wherein the pipe socket is guided in the case cover by means of an elastic bush which consists of two metal sockets and of an elastomeric intermediate layer.

4. The power-split gear as claimed in claim 1, wherein the distributor shaft passes through the gear case over the entire length of the latter and serves for driving a power takeoff shaft.

5. The power-split gear as claimed in claim 1, with an oil pump arranged on the cover, wherein a duct is provided in each case in the cover and at the bottom of the case, said ducts sealingly adjoining one another in the lower part of the cover, the duct forming an intake mouth in the case.

6. The power-split gear as claimed in claim 5, wherein an oil filter is mounted on the outside of the cover, said oil filter being connected to the intake mouth by ducts in the cover.

7. The power-split gear as claimed in claim 5, wherein an oil filter is mounted on the outside of the cover, said oil filter being connected to the oil pump by ducts in the cover.

8. The power-split gear as claimed in claim 1, wherein the control elements arranged on an outer face of the cover comprise a valve block.

9. The power-split gear as claimed in claim 1, wherein the cover has a bore for a revolution sensor, s aid bore leading from the inside outward.

10. The power-split gear as claimed in claim 1, wherein the cover is arranged on a side face of the case.

* * * * *